(12) United States Patent
Lee (10) Patent No.: US 6,386,719 B1
(45) Date of Patent: May 14, 2002

(54) PRECISION MOUNTING OF FRONT SURFACE MIRRORS

(75) Inventor: Philip H. Lee, Glendale, CA (US)

(73) Assignee: Enroute, Inc., Palo Alto, CA (US)

( * ) Notice: Subject to any disclaimer, the term of this patent is extended or adjusted under 35 U.S.C. 154(b) by 0 days.

(21) Appl. No.: 09/808,779

(22) Filed: Mar. 14, 2001

(51) Int. Cl.⁷ ............................................... G02B 7/182
(52) U.S. Cl. ..................... 359/879; 359/880; 359/881; 359/871; 359/872
(58) Field of Search ................. 359/879, 880, 359/881, 871, 872, 838, 220, 221, 223, 224, 225, 865

(56) References Cited

U.S. PATENT DOCUMENTS

| | | | |
|---|---|---|---|
| 2,942,516 A | 6/1960 | Disney et al. ................. | 352/70 |
| 3,118,340 A | 1/1964 | Iwerks ......................... | 352/70 |
| 5,539,483 A | 7/1996 | Nalwa ......................... | 353/94 |
| 5,745,305 A | 4/1998 | Nalwa ......................... | 359/725 |
| 5,793,527 A | 8/1998 | Nalwa ......................... | 359/403 |
| 5,920,376 A | 7/1999 | Bruckstein et al. ........... | 352/69 |
| 5,953,164 A * | 9/1999 | Arnone et al. .............. | 359/818 |
| 5,990,934 A | 11/1999 | Nalwa ......................... | 348/36 |
| 6,111,702 A | 8/2000 | Nalwa ......................... | 359/725 |
| 6,115,176 A | 9/2000 | Nalwa ......................... | 359/403 |
| 6,128,143 A | 10/2000 | Nalwa ......................... | 359/725 |
| 6,141,145 A | 10/2000 | Nalwa ......................... | 359/403 |
| 6,144,501 A | 11/2000 | Nalwa ......................... | 359/725 |
| 6,147,790 A * | 11/2000 | Meier et al. ................. | 359/291 |
| 6,170,957 B1 * | 1/2002 | Kaspar ........................ | 359/877 |
| 6,175,443 B1 * | 1/2002 | Aksyuk et al. .............. | 359/291 |

FOREIGN PATENT DOCUMENTS

JP        8-125835        5/1996   ......... H04N/1/387

* cited by examiner

*Primary Examiner*—Mohammad Sikder
(74) *Attorney, Agent, or Firm*—Edward S. Mao; Bever, Hoffman & Harms, LLP (57) ABSTRACT

A system for aligning the reflective surface of a front surface mirror with a reference surface on a base structure includes a resilient support structure and a retaining structure. The front surface mirror is mounted on the resilient support structure. A contact region of the retaining structure is placed across a portion of both the reference surface and the reflective surface and is clamped to the reference surface. Because the contact region represents a coplanar portion of the retaining structure, and because the resilient support structure holds the reflective surface against the contact region, the reflective surface is aligned with the reference surface. An eight-sided camera according to the invention includes eight mirrors, each mirror being mounted in a resilient mounting structure and being clamped down by a retaining structure having a coplanar contact region spanning a reference surface and the mirror reflective surface.

27 Claims, 9 Drawing Sheets

PRECISION MOUNTING OF FRONT SURFACE MIRRORS

FIELD OF THE INVENTION

The present invention relates to mechanical assemblies, and in particular to a system for aligning planar surfaces of discrete components.

BACKGROUND OF THE INVENTION

Mechanical assemblies commonly include components having planar surfaces that require alignment. For example, optical assemblies often include mirrors that must be accurately positioned to provide proper imaging functionality. Typically, proper positioning of each mirror depends on the alignment of the reflective surface of the mirror with a planar reference surface in a base structure. In a conventional optical assembly, this alignment operation is generally performed using a combination spring-hook and adjustment screw mechanism.

Figure 1:
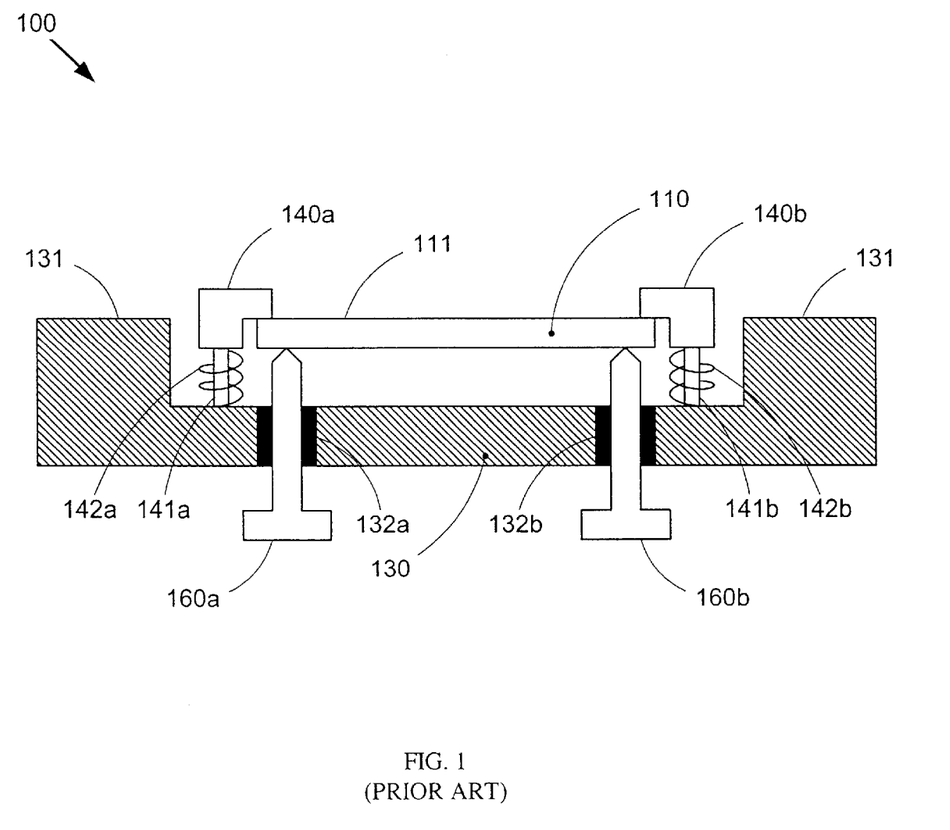
FIG. 1 is a diagram of an optical assembly including a conventional system for mounting a front surface mirror assembly.

For example, FIG. 1 shows a cross section of a conventional optical assembly 100, which includes a mirror 110, a base structure 130, retaining hooks 140a and 140b, guide posts 141a and 141b, extension springs 142a and 142b, and adjustment screws 160a and 160b. Mirror 110 comprises a reflective surface 111 formed on the top surface of a glass substrate, and is therefore called a "front surface mirror." Because reflected light rays do not have to pass through a layer of glass (as they would in a second surface mirror, i.e., a mirror in which the reflective surface is formed on the bottom surface of the glass substrate), undesirable aliasing and refraction effects are avoided. Base structure 130 includes a planar reference surface 131 that specifies the target plane for reflective surface 111; i.e., the plane in which reflective surface 111 must lie for mirror 110 to provide accurate imaging.

Adjustment screws 160a and 160b are installed in, and extend through, threaded holes 132a and 132b, respectively, in base structure 130. Retaining hooks 140a and 140b are slidably coupled to base structure 130 by guide posts 141a and 141b, respectively, and are attached to base structure 130 by extension springs 142a and 142b, respectively. When retaining hooks 140a and 140b are hooked over the edges of mirror 110, mirror 110 is held firmly against the protruding tips of adjustment screws 160a and 160b by the retentive force of extension springs 142a and 142b. Adjustment screws 160a and 160b can then be used to adjust the vertical position and angular orientation of mirror 110, so as to align reflective surface 111 with reference surface 131 of base structure 130.

Unfortunately, the conventional mirror positioning technique of optical assembly 100 is subject to two significant limitations. First, it is difficult to verify the proper positioning of mirror 110. Even though reflective surface 111 may appear to be aligned with reference surface 131 to the naked eye, even a slight amount of skew between the two surfaces can lead to significant imaging errors in sensitive or high resolution optical assemblies. Therefore, the manual alignment process required by optical assembly 100 can require a time-consuming iterative calibration sequence (i.e., adjust positioning, then test, then adjust based on results, and so on).

Secondly, optical assembly 100 requires recalibration whenever mirror 110 is replaced, due to the fact that mirrors are generally not held to tight thickness tolerances. While base structure 130 is typically made from a readily machinable material and can therefore be milled to highly accurate dimensions, lapping a glass component (such as a mirror substrate) to a precise thickness can be difficult and expensive. Therefore, if mirror 110 is replaced, adjustments will have to be made to screws 160a and 160b to accommodate the new mirror thickness. In addition, even if mirror 110 is simply removed and then reinstalled, play between the threads of adjustment screws 160a and 160b and threaded holes 132a and 132b, respectively, may necessitate a recalibration.

Accordingly, it is desirable to provide a system for accurately and repeatably aligning planar surfaces of components in a mechanical assembly that does not require an iterative calibration procedure and can accommodate deviations in the non-planar dimensions of the components.

SUMMARY OF THE INVENTION

The present invention provides a planar surface alignment system that uses the planar surfaces themselves to perform the alignment, thereby ensuring accurate positioning while eliminating the need for calibration. According to one embodiment of the present invention, a first planar surface of an auxiliary component is aligned with a reference planar surface of a base component by a retaining element having a base contact region and an auxiliary contact region. The base contact region and the auxiliary contact region are coplanar portions of the retaining element. The base contact region is clamped against the reference planar surface, and the first planar surface is held against the auxiliary contact region by a resilient force. Therefore, the base contact region is aligned with the reference planar surface, and the first planar surface is aligned with the auxiliary contact region. Because the auxiliary contact region and the base contact region are coplanar, the first planar surface is aligned with the reference planar surface.

In another embodiment of the present invention, a front surface mirror is mounted on elastic pads in a well in a base structure. The elastic pads are configured to displace the planar reflective surface of the front surface mirror away from the planar reference surface. Retaining clips having coplanar contact regions are screwed to the base structure such that portions of the coplanar contact regions are clamped against the planar reference surface, and other portions of the coplanar contact regions contact the planar reflective surface. The elastic pads deform in response to the loading from the retaining clips, allowing the contact regions to position the planar reflective surface. In this manner, the planar reflective surface is aligned to the planar reference surface via the contact regions of the retaining clips.

According to another embodiment of the present invention, the elastic pads are formed from an elastomer or other resilient material, and can have any desired cross-section. The elastic pads can be placed under all edges of the front surface mirror, or can be placed at selected locations. The elastic pads can be attached to the front surface mirror, to the base structure, or can be a completely separate component of the optical assembly. According to another embodiment of the present invention, the elastic pads can be replaced with a resilient support structure using mechanical springs. Alternatively, gas or hydraulic cylinders can be used to provide the resilient force.

According to another embodiment of the present invention, the retaining clips comprise straight elements positioned over two opposite edges of the mirror. According to another embodiment of the invention, the retaining clips comprise a plurality of smaller elements positioned at various intervals around the perimeter of the mirror. According to another embodiment of the present invention, a single retaining clip clamps along the entire perimeter of the mirror. According to another embodiment of the present invention, the screwed-down retaining clips can be replaced with retaining elements are hinged to the base structure and pulled tight against the planar reference surface by springs. According to another embodiment of the present invention, the screwed-down retaining clips can be replaced with retaining elements that are clamped against the planar reference surface by mechanical latching mechanisms.

According to another embodiment of the present invention, a camera system includes multiple camera-mirror arrangements, each camera being aimed at its associated mirror, the mirror directing the camera field of view away from a central axis of the camera system. Each of the mirrors is mounted in a resilient mounting structure, and clamped in place by a set of retaining clips. Each retaining clip in the set includes a coplanar contact region that spans a planar reference surface and a portion of the reflective surface of the mirror. Because the resilient mounting structure holds the mirror against the retaining clips, the reflective surface of the mirror is aligned with the planar reference surface. According to an embodiment of the present invention, the outward facing camera system comprises an eight-sided camera system.

The present invention will be more fully understood in view of the following description and drawings.

BRIEF DESCRIPTION OF THE DRAWINGS

FIG. 2b is an illustrative diagram of an intermediate stage in the assembly of the optical assembly of FIG. 2a.

DETAILED DESCRIPTION

Figure 2A:
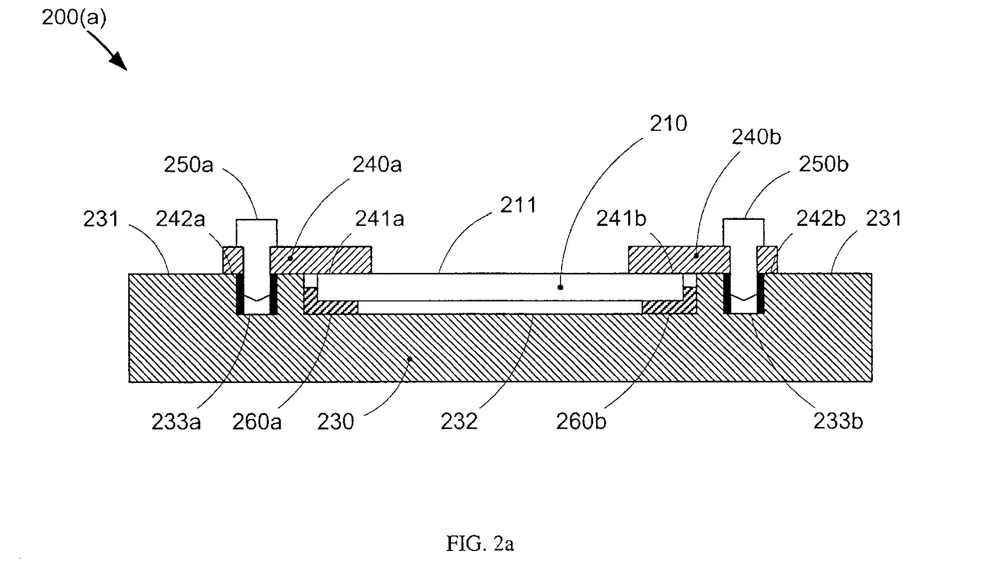
FIG. 2a is a diagram of an optical assembly including a system for mounting a front surface mirror assembly in accordance with an embodiment of the present invention.

FIG. 2a shows an optical assembly 200(a) comprising a front surface mirror 210 and a base structure 230. Front surface mirror 210 includes a planar reflective surface 211, while base structure 230 includes a planar reference surface 231, which represents a target alignment plane for planar reflective surface 211. While planar reference surface 231 can comprise a single continuous surface, it can also comprise a plurality of coplanar regions—for instance, multiple features on base structure 230 that have been milled to a common height during a single machining operation. Also, base structure 230, while depicted as a single component, can itself comprise an assembly of sub-components.

Figure 2B:
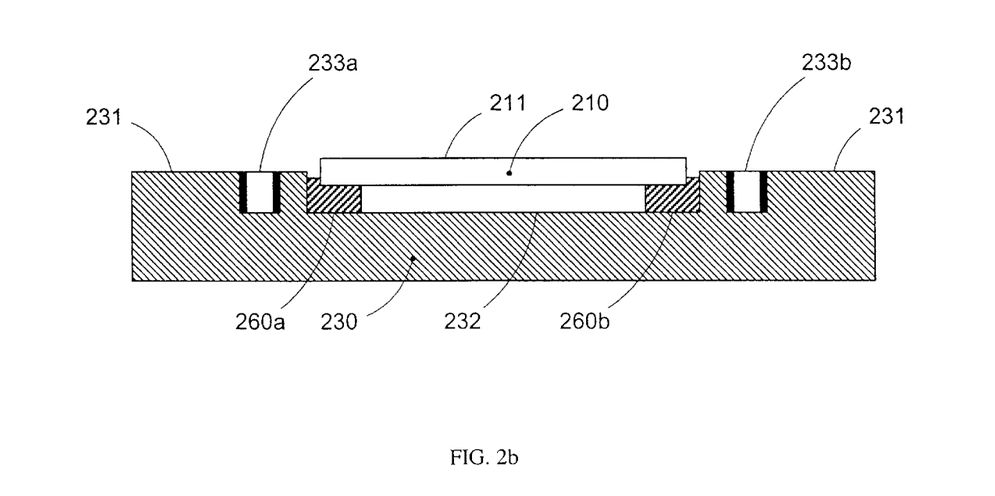

Front surface mirror 210 is mounted in an installation well 232 in base structure 230, and is held in place between retaining clips 240a and 240b and elastic pads 260a and 260b. Elastic pads 260a and 260b are configured to apply a resilient force to front surface mirror 210 that holds planar reflective surface against retaining clips 240a and 240b. FIG. 2b shows an intermediate assembly view of optical assembly 200(a), prior to the installation of retaining clips 240a and 240b. Without the compressive force provided by retaining clips 240a and 240b, the thicknesses of elastic pads 260a and 260b tend to displace planar reflective surface 211 away from planar reference surface 231. As used herein, a first surface being "displaced away from" a second surface means that the first surface is substantially separated from the second surface in the direction in which the second surface is facing. For example, in FIG. 2b, planar reference surface 231 is facing in a substantially vertical direction. Therefore, planar reflective surface 211 is displaced away from planar reference surface 231 because it is above that surface. Likewise, if the view in FIG. 2b were rotated 180°, planar. reflective surface 211 would be displaced away from planar reference surface 231 if it were substantially below planar reference surface 231.

Returning to FIG. 2a, retaining clip 240a comprises a mirror contact region 241a and a base contact region 242a. Similarly, retaining clip 240b comprises a mirror contact region 241b and a base contact region 242b. Retaining clips 240a and 240b are secured to base structure 230 by retaining screws 250a and 250b, respectively. When retaining screws 250a and 250b are screwed into threaded holes 233a and 233b, respectively, mirror contact regions 241a and 241b apply downward pressure to planar reflective surface 211. Contact region 241a comprises a coplanar portion of retaining clip 240a, while contact region 241b comprises a coplanar portion of retaining clip 204b. Elastic pads 260a and 260b deform in response to this loading from retaining clips 240a and 240b, exerting a resilient force against front surface mirror 210 that holds planar reflective surface 211 against mirror contact regions 241a and 241b.

Once retaining screws 250a and 250b are fully tightened, base contact regions 242a and 242b are both firmly clamped against (and therefore aligned with) planar reference surface 231. At the same time, planar reflective surface 211 is held firmly against (and therefore aligned with) mirror contact regions 241a and 241b by elastic pads 260a and 260b. Because mirror contact regions 241a and 241b are coplanar with base contact regions 242a and 242b, respectively, planar reflective surface 211 is aligned with planar reference surface 231, thereby properly positioning front surface mirror 210. In the embodiment of FIG. 2a, mirror contact region 241a and base contact region 242a are portions of a single planar surface of retaining clip 240a. However, in other embodiments of the present invention, mirror contact region 241a and base contact region 242a can be disjoint but coplanar points, surfaces, or edges. Furthermore, retaining clip 240a can comprise any cross section that provides a coplanar mirror contact region 241a and base contact region 242a. Similar design flexibility applies to retaining clip 240b.

Base structure 230 and retaining clips 240a and 240b can be manufactured from any dimensionally stable and machinable material (e.g., aluminum alloys, stainless steels, or structural phenolics). Therefore, planar reference surface 231 and contact regions 241a and 241b can be produced with the tight tolerances needed for high-resolution imaging. At the same time, elastic pads 260a and 260b provide a resilient mounting structure that compensates for variations in the thickness of front surface mirror 210. Therefore, planar reflective surface 211 can be very accurately positioned in optical assembly 200(*a*). In addition, the positioning of front surface mirror 210 requires no special calibration, other than ensuring that retaining clips 240a and 240b are firmly secured (i.e., clamped) to base structure 230. In other words, the installation process for front surface mirror 210 automatically aligns planar reflective surface 211 with planar reference surface 231.

Figure 5A:
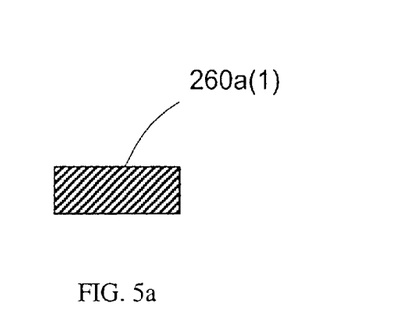
FIGS. 5a–5c are cross-sections of various elastic pads in accordance with embodiments of the present invention.
Figure 5B:
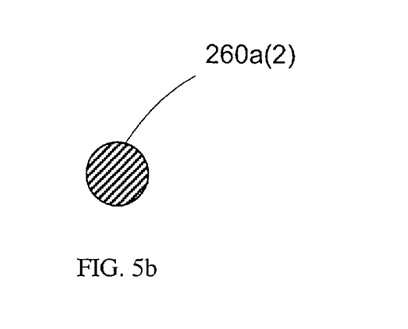
Figure 5C:
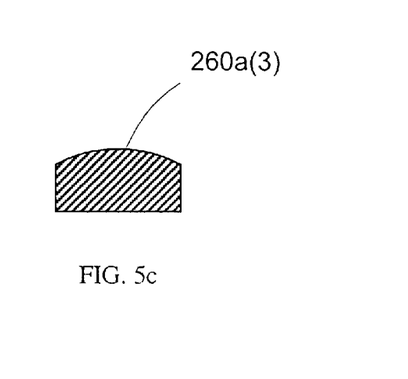

To provide the resilient force that holds reflective surface 211 in contact with retaining clips 240a and 240b, elastic pads 260a and 260b can be formed from an elastomer (e.g., silicone rubber, such as McMaster-Carr® part number 8608K521) or other similarly resilient material (e.g., various non-elastomeric foams). Elastic pads 260a and 260b can be attached (e.g., glued) to base structure 230, to front surface mirror 210, or could be unattached to either. While elastic pads 260a and 260b are both shown having a lip that wraps around the edge of front surface mirror 210, the elastic pads are not limited to any particular cross section. For example, FIGS. 5a–5c show examples of elastic pads in accordance with various embodiments of the present invention. FIG. 5a shows a basic rectangular elastic pad 260a(1), similar to elastic pad 260a shown in FIGS. 2a and 2b, but without any lip. FIG. 5b shows a round elastic pad 260a(2), and FIG. 5c shows an elastic pad 260a(3) having a flat bottom surface but a rounded top surface.

Elastic pads 260a and 260b are furthermore not restricted to a particular plan view. For example, elastic pads 260a and 260b can each be a single strip of elastomer along opposing edges of front surface mirror 210. Alternatively, elastic pads 260a and 260b could be part of a single elastic gasket that supports the entire perimeter of front surface mirror 210. Elastic pads 260a and 260b could also be two of a plurality of small pads spaced at various intervals along the edges of front surface mirror 210. Elastic pads 260a and 250b could even be replaced by a single pad or grouping of pads that support the central portion of front surface mirror 210, and do not extend to the edges of front surface mirror 210. Accordingly, any elastic pad configuration can be used that is capable of displacing planar reflective surface 211 away from planar reflective surface 231.

Figure 3A:
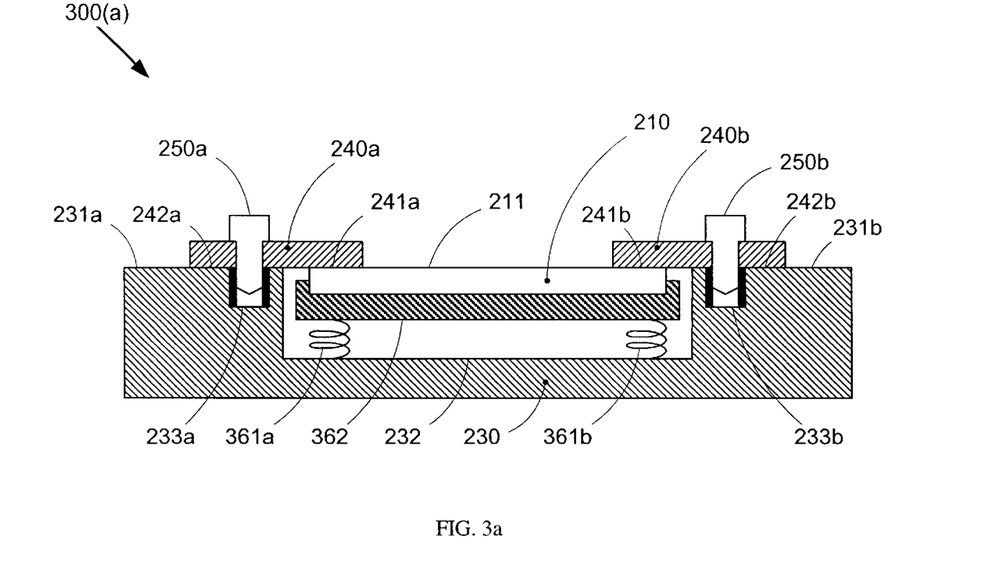
FIGS. 3a and 3b are diagrams of optical assemblies including alternative resilient support structures in accordance with embodiments of the present invention.

While elastic pads 260a and 260b are shown in FIG. 2a, any resilient support structure providing a similar resilient force on front surface mirror 210 could be used; e.g., mechanical springs, hydraulic or gas cylinders, etc. FIG. 3a shows an optical assembly 300(*a*), in accordance with another embodiment of the present invention. Optical assembly 300(*a*) is substantially similar to optical assembly 200(*a*), but has a different resilient support structure. Elastic pads 260a and 260b have been replaced by compression springs 361a and 361b and a support tray 362. Front surface mirror 210 is placed in support tray 362, and compression springs 361a and 361b apply a resilient force to support tray 362 that holds planar reflective surface 211 against contact regions 241a and 241b of retaining clips 240a and 240b, respectively.

Figure 3B:
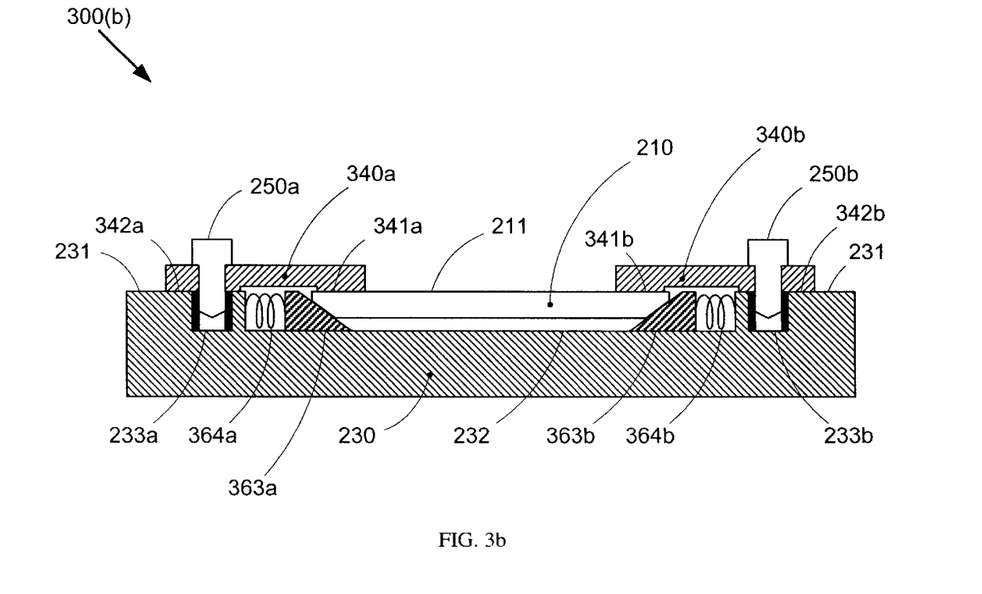

FIG. 3b shows an optical assembly 300(*b*), in accordance with another embodiment of the present invention. Optical assembly 300(*b*) is substantially similar to optical assembly 200(*a*), but once again includes a different resilient support structure. Rather than elastic pads, optical assembly 300(*b*) includes chamfered sliding shims 363a and 363b and compression springs 364a and 364b. Shims 363a and 363b are arranged such that their chamfers are facing each other, providing a pocket in which front surface mirror 210 can be placed. Compression springs 364a and 364b are configured to force sliding shims 363a and 363b towards each other, tending to raise front surface mirror 210 upward as the chamfers are forced under the edges of front surface mirror 210. In this manner, the desired resilient force is provided. The bottom edges of front surface mirror 210 are shown chamfered in FIG. 3b to provide additional contact (support) area with the chamfers of sliding shims 363a and 363b.

While retaining clips 240a and 240b (shown in FIG. 2a) provide a simple retaining structure for front surface mirror 210, any retaining structure can be used so long as the mirror and base contact regions are coplanar. For example, as noted previously, retaining clips 240a and 240b can have any cross section having coplanar mirror and base contact regions. Optical assembly 300(*b*) shown in FIG. 3b is substantially similar to optical assembly 200(*a*), but replaces rectangular retaining clips 240a and 240b with C-shaped retaining clips 340a and 340b, respectively, according to an embodiment of the present invention. The contact region of retaining clip 340a comprises disjoint mirror (341a) and base (342a) contact regions, as opposed to the single-surface contact region of retaining clip 240a. However, since mirror contact region 341a and base contact region 342a are coplanar, retaining clip 340a provides the same alignment functionality as retaining clip 240a. Similarly, C-shaped retaining clip 340b provides the same alignment functionality as rectangular retaining clip 240b.

Figure 6A:
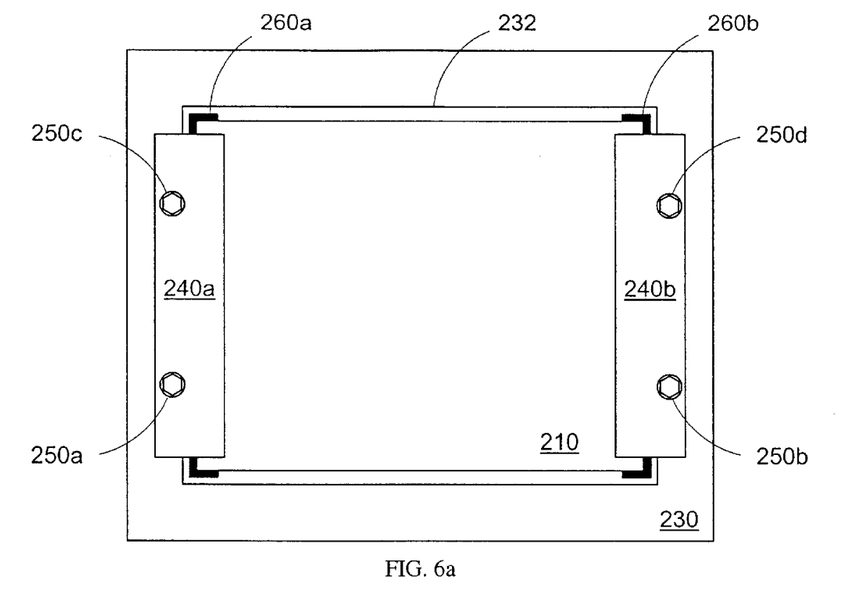
FIGS. 6a–6d are diagrams of alternative retaining structures in accordance with embodiments of the present invention.
Figure 6B:
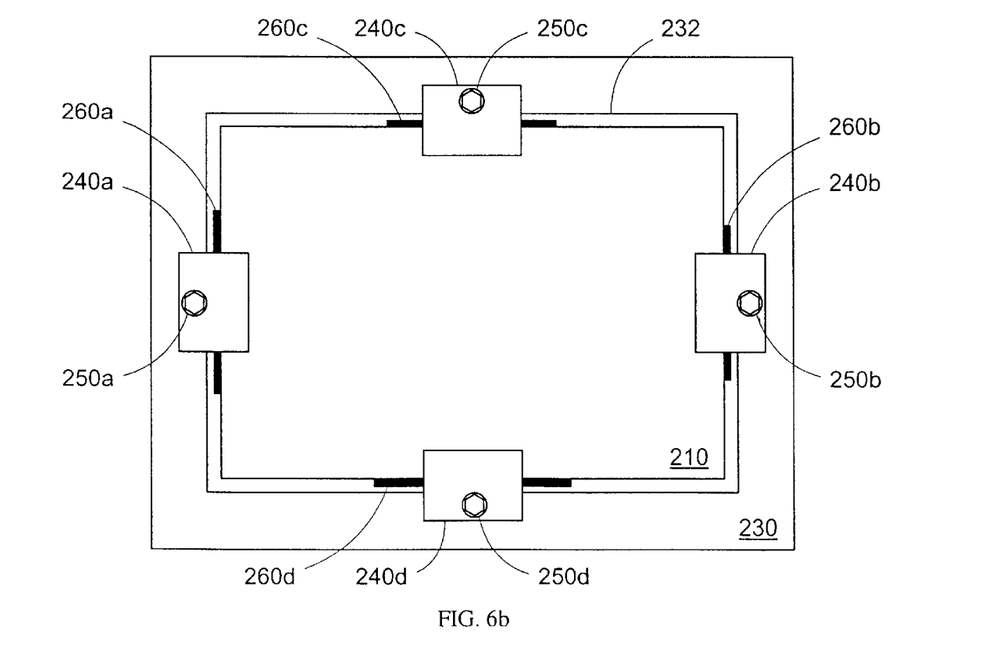
Figure 6C:
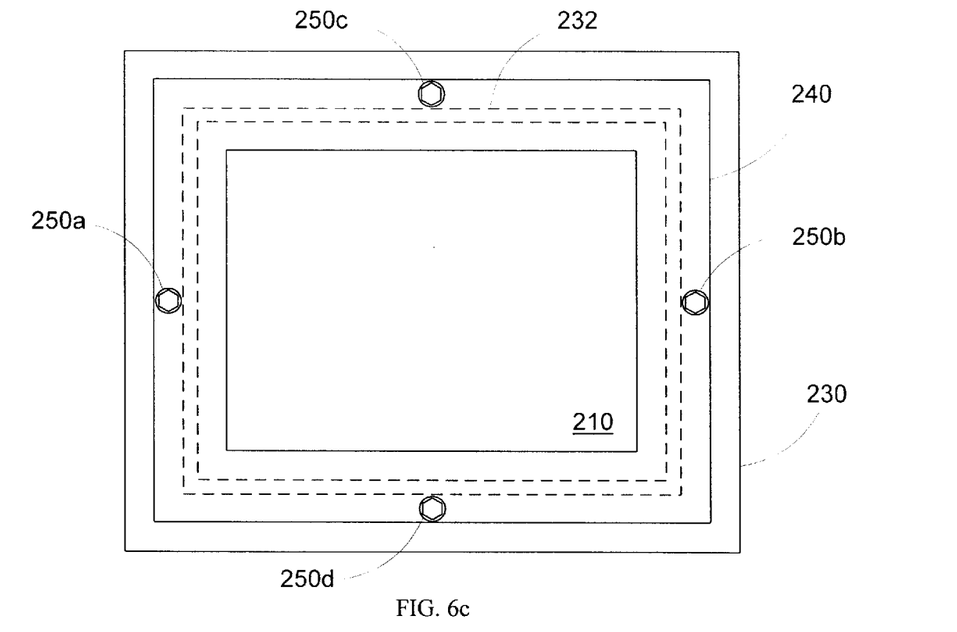
Figure 6D:
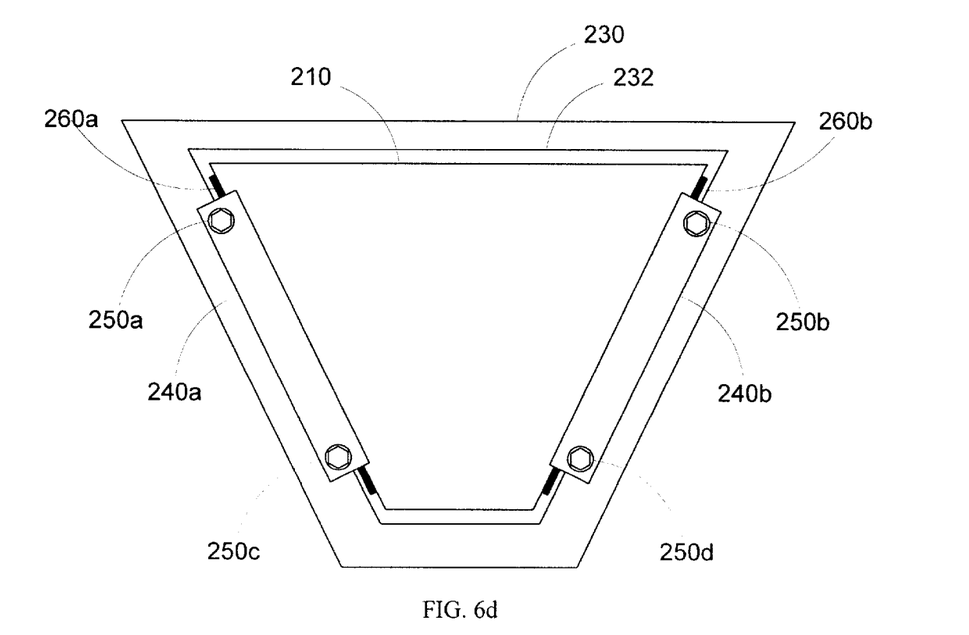

In addition to cross-section, retaining clips 240a and 240b are furthermore not restricted to any particular plan view. FIG. 6a shows a plan view of optical assembly 200(*a*) shown in FIG. 2a, in accordance with an embodiment of the present invention. In FIG. 6a, retaining clips 240a and 240b comprise straight strips substantially aligned with opposite edges of front surface mirror 210. FIG. 6b shows an alternative plan view of optical assembly 200(*a*), in accordance with another embodiment of the present invention. In FIG. 6b, retaining clips 240a and 240b (and additional retaining clips 240c and 240d) are smaller components, providing retention at only a portion of each edge of front surface mirror 210. FIG. 6c shows another plan view of optical assembly 200(*a*), in accordance with another embodiment of the present invention. In FIG. 6c, retaining clips 240a and 240b shown in FIG. 2a represent portions of a single clamping structure 240, which secures the entire perimeter of front surface mirror 210. Finally, FIG. 6d shows another plan view of optical assembly 200(*a*), in accordance with another embodiment of the present invention. In FIG. 6d, front surface mirror 210 is trapezoidal rather than rectangular. Straight retaining clips 240a and 240b (similar to those shown in FIG. 6a) at opposite edges of front surface mirror 210 provide the necessary clamping action. Accordingly, any of the retaining structures used with rectangular mirrors can be adapted for use with mirrors of other shapes.

Figure 7A:
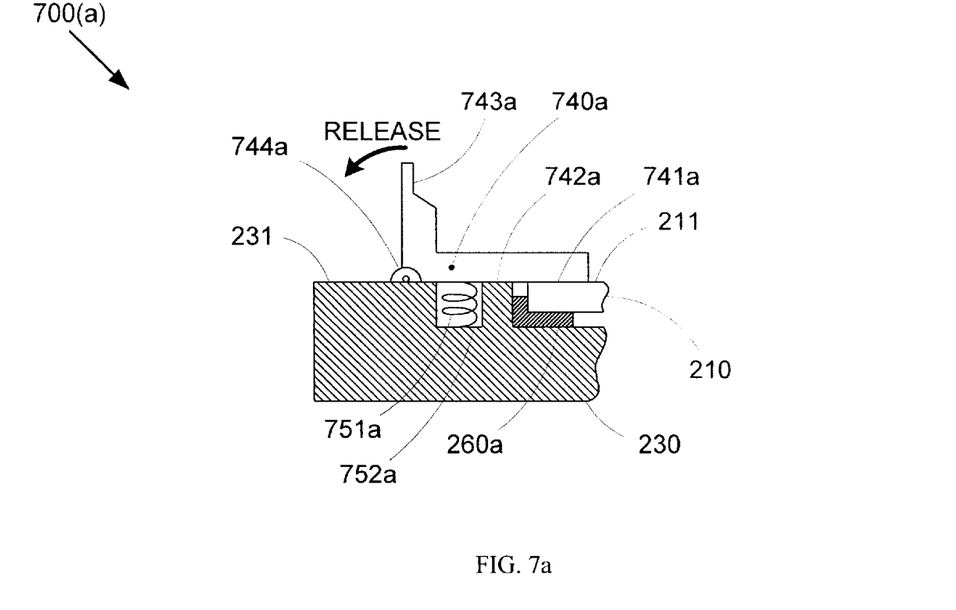
FIGS. 7a and 7b are diagrams of alternative clamping mechanisms in accordance with embodiments of the present invention.

While FIG. 2a depicts retaining screws 250a and 250b as the securing mechanisms for retaining clips 240a and 240b, respectively, any mechanism can be used that provides sufficient clamping force to overcome the resilient force produced by elastic pads 260a and 260b. For example, FIG. 7a shows a detail view of a retaining structure 700(*a*) in accordance with an embodiment of the present invention. Retaining structure 700(*a*) can be used in place of the screw/clamp retaining structure (screw 250a and clip 240a) shown in FIG. 2a. Retaining structure 700(*a*) comprises an L-shaped retaining clip 740a and an extension spring 751a. Retaining clip 740a includes a mirror contact region 741a, a base contact region 742*a*, and a release lever 743*a*, and is hinged to reference surface 231 at a hinge 744*a*. Mirror contact region 741*a* and base contact region 742*a* are coplanar. One end of extension spring 751*a* is affixed to base contact region 742*a*, while the other end is attached to base structure 230 in a well 752*a* below reference surface 231. Extension spring 751*a* pulls retaining clip 740*a* towards planar reference surface 231, forcing front surface mirror 210 downwards in the process. Elastic pad 260*a* deforms, holding planar reflective surface against mirror contact region 741*a*, thereby ensuring that planar reflective surface 211 is aligned with planar reference surface 231 once base contact region 742*a* is seated against planar reference surface 231. To release front surface mirror 210, release lever 743*a* can be moved in the direction marked RELEASE, pivoting retaining clip about hinge 744*a* and raising mirror contact region 741*a* away from planar reflective surface 211. Other spring-loaded retaining structures will be apparent to one skilled in the art.

Figure 7B:
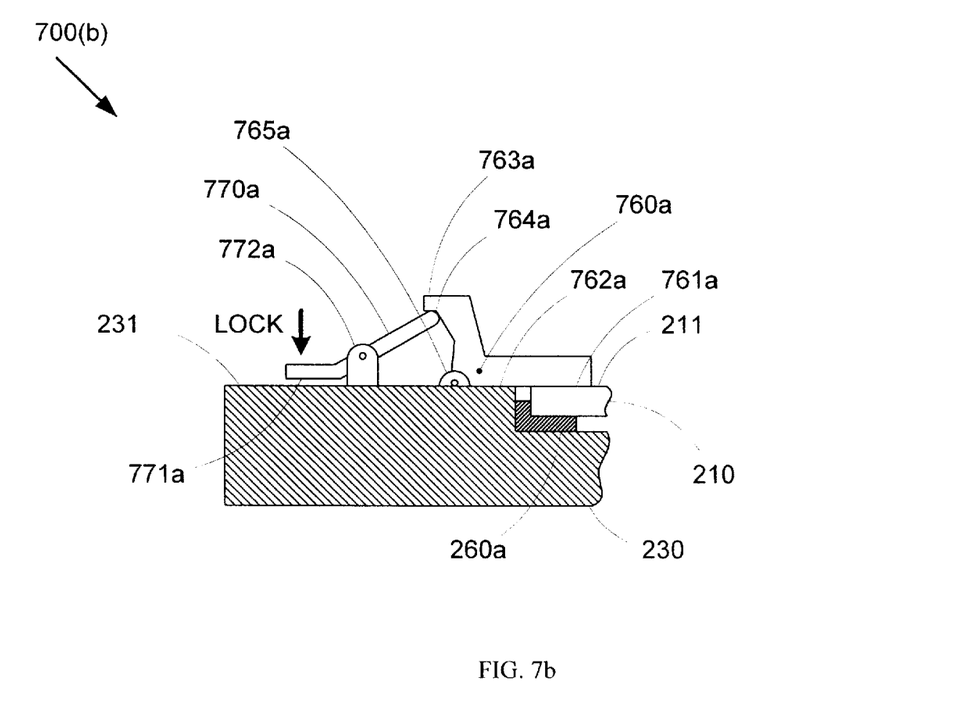

FIG. 7*b* shows a detail view of a retaining structure 700(*b*) in accordance with another embodiment of the present invention. Retaining structure 700(*b*), like retaining structure 700(*a*), can be used in place of the screw/clamp retaining structure shown in FIG. 2*a*. Retaining structure 700(*b*) comprises an L-shaped retaining clip 760*a* and a latch 770*a*. Retaining clip 760*a* includes a mirror contact region 761*a*, a base contact region 762*a*, and a locking flange 763*a*, which forms a mating pocket 764*a* for latch 770*a*. Mirror contact region 761*a* and base contact region 762*a* are coplanar. Retaining clip 760*a* is hinged to planar reference surface 231 at a hinge 765*a*. Latch 770*a* includes a locking lever 771*a* and is hinged to planar reference surface 231 at a hinge 772*a*. When locking lever 771*a* is moved in the direction marked LOCK, latch 770*a* pivots about hinge 772*a*, wedging itself into mating pocket 764*a* of retaining clip 760*a*. This in turn forces base contact region 762*a* down onto planar reference surface 231, and similarly forces reflective surface 211 into alignment with planar reference surface 231. Moving locking lever 771*a* in the opposite direction of direction LOCK "unwedges" latch 770*a* from mating pocket 764*a*, allowing retaining clip 760*a* to pivot about hinge 765*a*, thereby releasing the downward pressure on front surface mirror 210. Other mechanical latch retaining mechanisms will be apparent to one skilled in the art.

Figure 4A:
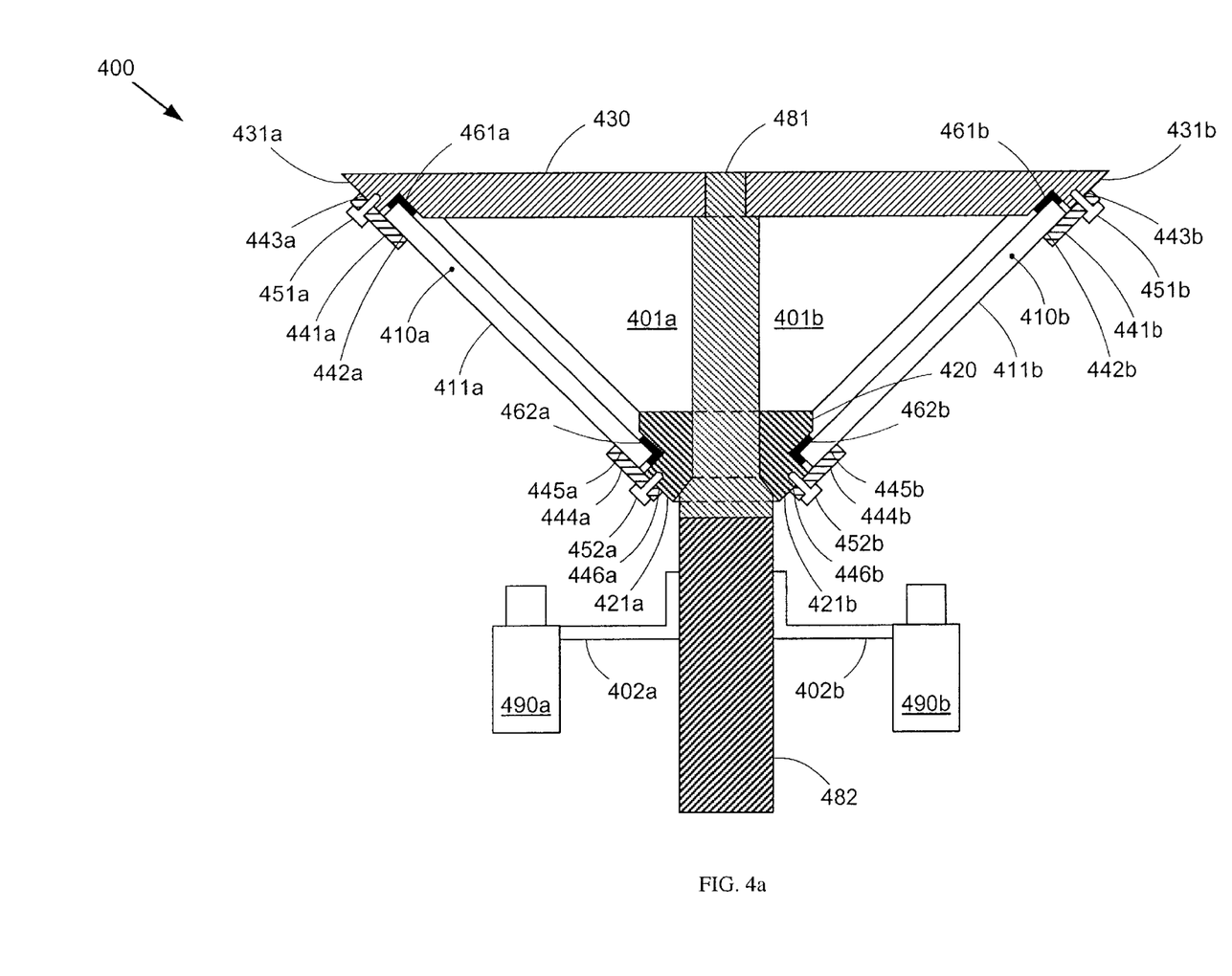
FIG. 4a is a diagram of an outward facing camera system in accordance with an embodiment of the present invention.

As additional mirrors are integrated into an optical assembly, positioning accuracy becomes even more critical, as the cumulative effect of small misalignments at each mirror can cause substantial overall performance degradation. The present invention minimizes such performance degradation by ensuring proper alignment of each mirror in a multi-mirror optical assembly. FIG. 4*a* shows a diagram of a camera system 400 in accordance with an embodiment of the present invention. Camera system 400 employs multiple mirrors to allow multiple cameras to look radially outward from the central axis of the system. The fields of view of the multiple cameras can be combined to form a panoramic or 360° image. According to an embodiment of the present invention, the cameras can be replaced with projectors to display a panoramic image.

Camera system 400 comprises front surface mirrors 410*a* and 410*b*, a mirror support shaft 481, a top plate 430, a bottom plate 420, gussets 401*a* and 401*b*, elastic pads 461*a*, 461*b*, 462*a*, and 462*b*, retaining clips 441*a*, 441*b*, 442*a*, and 442*b*, retaining screws 451*a*, 451*b*, 452*a*, and 452*b*, a camera support shaft 482, camera support arms 402*a* and 402*b*, and cameras 490*a* and 490*b*. Top plate 430 and bottom plate 420 are mounted on mirror support shaft 441 and are supported by gussets 401*a* and 401*b*. Top plate 430 comprises planar reference surfaces 431*a* and 431*b*, while bottom plate 420 comprises planar reference surfaces 421*a* and 421*b*. Planar reference surfaces 431*a* and 421*a* are aligned to form a first target plane, and planar reference surfaces 431*b* and 421*b* are aligned to form a second target plane. Mirror support shaft 441 can include positioning features (e.g. flats or notches) that mate with corresponding features on top plate 430 and bottom plate 420 to ensure alignment of planar reference surfaces 431*a* and 431*b* with planar reference surfaces 421*a* and 421*b*, respectively. Cameras 490*a* and 490*b* are mounted to camera support shaft 482 by camera support arms 402*a* and 402*b*, respectively, and camera support shaft 482 is coaxially coupled to mirror support shaft 481. Cameras 490*a* and 490*b* are aimed along the axis of camera support shaft 482 (i.e., vertically) at planar reflective surfaces 411*a* and 411*b*, respectively, of front surface mirrors 410*a* and 410*b*, respectively. When planar reflective surfaces 411*a* and 411*b* are aligned with the first and second target planes, respectively, cameras 490*a* and 490*b*, respectively, can capture their intended fields of view, and the proper imaging function of camera system 400 can be achieved.

Front surface mirror 410*a* is mounted on elastic pads 461*a* and 462*a* and is held in place by retaining clips 441*a* and 444*a*. Retaining clips 441*a* and 444*a* include mirror contact regions 442*a* and 445*a*, respectively, and base contact regions 443*a* and 446*a*, respectively. Therefore, when retaining screws 451*a* and 452*a* are tightened down, base contact regions 443*a* and 446*a*, respectively, are clamped against planar reference surfaces 431*a* and 421*a*, respectively. At the same time, planar reflective surface 411*a* of front surface mirror 410*a* is held against mirror contact regions 442*a* and 445*a* by elastic pads 461*a* and 462*a*, respectively. Because mirror contact regions 442*a* and 445*a* are coplanar with base contact regions 443*a* and 446*a*, respectively, planar reflective surface 411*a* of front surface mirror 410*a* is aligned with the first target plane, in substantially the same manner as described with respect to the alignment of planar reflective surface 211 in FIG. 2*a*. Similarly, the tightening of retaining screws 451*b* and 452*b* clamps retaining clips 441*b* and 444*b*, respectively, against planar reference surfaces 431*b* and 421*b*, respectively, and aligns planar reflective surface 411*b* of front surface mirror 410*b* with the second target plane. 391 In this manner, front surface mirrors 410*a* and 410*b* are properly aligned in camera system 400. According to other embodiments of the present invention, front surface mirrors 410*a* and 410*b* can be clamped in place by various other retaining clip configurations. For example, rather than being held at their horizontal (i.e., top and bottom) edges as shown in FIG. 4*a*, front surface mirrors 410*a* and 410*b* could be clamped at their sides, similar to the configuration depicted in FIG. 6*d*. Similarly, elastic pads 461*a*, 461*b*, 462*a*, and 462*b* can be replaced by other elastic pad configurations (such as shown in FIGS. 5*a*–5*c*) or even by other resilient force-generating mechanisms (such as shown in FIGS. 3*a* and 3*b*).

Figure 4B:
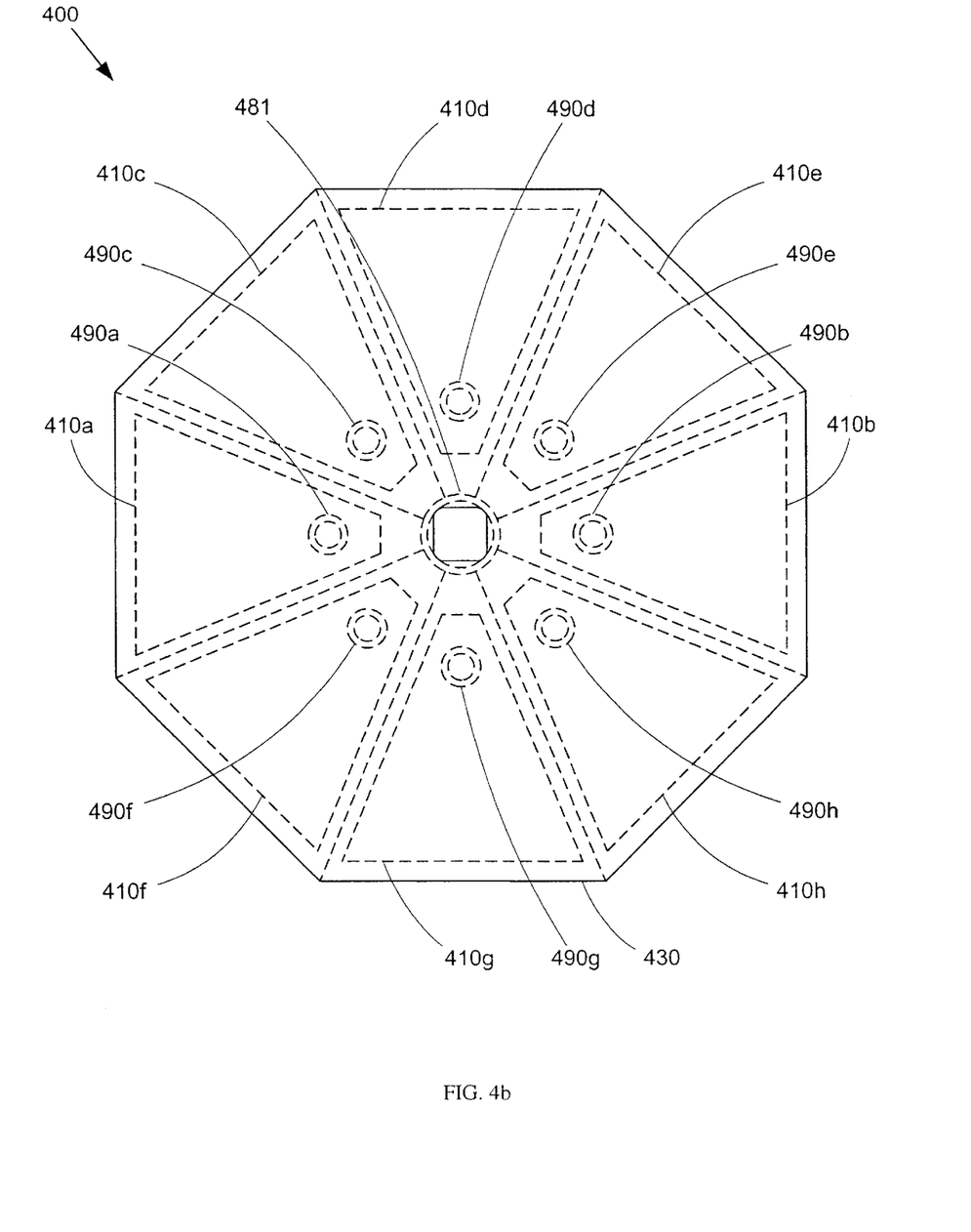
FIG. 4b is a diagram of an eight-sided camera system in accordance with an embodiment of the present invention.

FIG. 4*b* shows a top view of camera system 400, in accordance with an embodiment of the present invention. As shown in FIG. 4*b*, camera system 400 comprises eight front surface mirrors 410*a*–410*h*, which provide imaging paths for cameras 490*a*–490*h*, respectively. Each of mirrors 410*c*–410*d* is mounted in much the same manner as mirrors 410*a* and 410*b* shown in FIG. 4*a*. Because camera system 400 includes eight mirrors positioned around camera support shaft 482, it is sometimes referred to as an "eight-sided camera system." Note however, that the present invention is applicable to a camera system having any number of sides.

In the above-described manner, accurate positioning of planar surfaces in an assembly is achieved via by the installation process itself. Therefore, an assembly in accordance with the present invention does not require time-consuming post-assembly adjustments. At the same time, precise alignment of the planar surfaces is ensured, since the positioning of those surfaces is controlled by the surfaces themselves. Although the present invention is described with reference to optical assemblies, the present invention can be incorporated in any type of assembly in which alignment of planar surfaces is desired. The various embodiments of the structures and methods of this invention that are described above are illustrative only of the principles of this invention and are not intended to limit the scope of the invention to the particular embodiments described. For example, in view of this disclosure, those skilled in the art can define other resilient support structures, retaining structures, and so forth, and use those alternative features to create a method or system according to the principles of this invention. Thus, the invention is limited only by the following claims.

What is claimed is:

1. An optical assembly comprising:
    a base structure having a planar reference surface;
    a resilient support structure;
    a front surface mirror having a planar reflective surface, the front surface mirror being mounted on the resilient support structure, the resilient support structure being configured to displace the planar reflective surface away from the planar reference surface;
    a first retaining structure comprising a first base contact region and a first mirror contact region, wherein the first base contact region and the first mirror contact region are coplanar, the first base contact region being clamped against the planar reference surface, and the planar reflective surface being held against the first mirror contact region by the resilient support structure.

2. The optical assembly of claim 1, wherein the resilient support structure comprises a first pad made from a resilient material.

3. The optical assembly of claim 2, wherein the resilient material comprises an elastomer.

4. The optical assembly of claim 2, wherein the resilient material comprises a closed-cell foam.

5. The optical assembly of claim 2, wherein the first pad is attached to the first component.

6. The optical assembly of claim 2, wherein the first pad is attached to the front surface mirror.

7. The optical assembly of claim 2, wherein the first pad is attached to the base structure.

8. The optical assembly of claim 2, wherein the first pad comprises a substantially rectangular cross-section.

9. The optical assembly of claim 8, wherein the first pad further comprises a lip running along an edge of the first pad, the lip being configured to wrap around an edge of the front surface mirror.

10. The optical assembly of claim 2, wherein the first pad comprises a substantially round cross section.

11. The optical assembly of claim 2, wherein the first pad comprises a cross section having a flat bottom edge and a curved top edge.

12. The optical assembly of claim 2, wherein the first pad supports the entire perimeter of the front surface mirror.

13. The optical assembly of claim 2, wherein the first pad is positioned at least a first distance from each edge of the front surface mirror.

14. The optical assembly of claim 2, wherein the resilient support structure further comprises a second pad made from the resilient material.

15. The optical assembly of claim 14, wherein the first pad supports a first edge of the front surface mirror, and the second pad supports a second edge of the front surface mirror.

16. The optical assembly of claim 1, wherein the mirror contact region contacts the entire perimeter of the planar reflective surface.

17. The optical assembly of claim 1, wherein the first base contact region and the first mirror contact region are part of a single surface.

18. The optical assembly of claim 1, wherein the first base contact region and the first mirror contact region are disjoint surfaces.

19. The optical assembly of claim 1, further comprising a second retaining structure including a second base contact region, and a second mirror contact region, wherein the second base contact region and the second mirror contact region are coplanar, the second base contact region being clamped against the planar reference surface, and the planar reference surface being held against the second mirror contact region.

20. The optical assembly of claim 19, wherein the first mirror contact region contacts substantially the entire length of a first edge of the planar reflective surface, and wherein the second mirror contact region contacts substantially the entire length of a second edge of the planar reflective surface, wherein the first edge and the second edge comprise opposite edges of the planar reflective surface.

21. The optical assembly of claim 1, wherein the first base contact region is clamped against the planar reference surface by a screw, the screw being screwed into the base structure through the first retaining structure.

22. A method for aligning a reflective surface of a front surface mirror with a planar reference surface of a base structure, the method comprising:
    applying a resilient force to the front surface mirror, the resilient force tending to displace the reflective surface away from the planar reference surface; and
    clamping a first base contact region of a first retaining structure against the planar reference surface, wherein the resilient force holds the reflective surface against a first mirror contact region of the first retaining structure, and wherein the first base contact region and the first mirror contact region are coplanar.

23. The method of claim 22, wherein applying the resilient force to the front surface mirror comprises mounting the front surface mirror on a pad made from a resilient-material.

24. The method of claim 22, wherein clamping the first contact region comprises screwing the first retaining structure to the base structure.

25. The method of claim 22, further comprising clamping a second contact region of a second retaining structure against the planar reference surface, wherein the second contact region comprises a coplanar portion of the second retaining structure, and wherein the second contact region also contacts the planar reflective surface.

26. The method of claim 25, wherein the first contact region contacts a first edge of the planar reflective surface, and wherein the second contact region contacts a second edge of the planar reflective surface.

27. The method of claim 22, wherein the first contact region contacts the entire perimeter of the planar reflective surface.

* * * * *